United States Patent [19]
Nolte

[11] Patent Number: 5,923,257
[45] Date of Patent: Jul. 13, 1999

[54] CARAFE WITH THERMAL SENSOR AND DIGITAL DISPLAY

[76] Inventor: Ray J. Nolte, 2403 Telegraph Rd., St. Louis, Mo. 63125

[21] Appl. No.: 09/027,296

[22] Filed: Feb. 23, 1998

[51] Int. Cl.[6] .................................................. G08B 17/00
[52] U.S. Cl. .......................... 340/584; 340/622; 340/691; 340/693; 99/288; 374/170; 374/208
[58] Field of Search ...................... 340/584, 622, 340/540, 586, 588, 693, 691; 99/281, 285, 288, 308, 279, 485; 374/149, 150, 170, 192, 208

[56] References Cited

U.S. PATENT DOCUMENTS

| | | | |
|---|---|---|---|
| 4,782,617 | 11/1988 | Peikin | 43/18.1 |
| 4,825,757 | 5/1989 | Stoner | 99/279 |
| 4,841,849 | 6/1989 | Shimomura et al. | 99/282 |
| 5,000,581 | 3/1991 | Yata et al. | 374/150 |
| 5,678,925 | 10/1997 | Garmaise et al. | 374/157 |
| 5,680,108 | 10/1997 | Daniell et al. | 340/603 |

*Primary Examiner*—Jeffery A. Hofsass
*Assistant Examiner*—Anh La

[57] ABSTRACT

A method of displaying the temperature of the coffee in a carafe's bowl is accomplished by fastening a thermistor to the metal band supporting the bowl and with proper circuit board components displaying that temprature on a digital display on the carafe's handle.

18 Claims, 4 Drawing Sheets

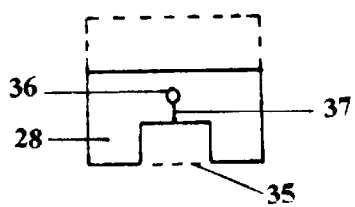
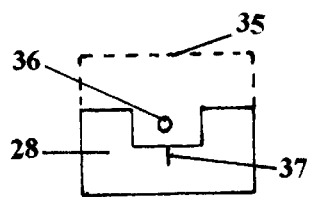
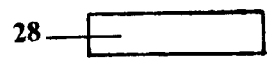
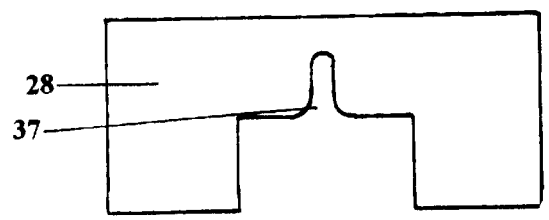
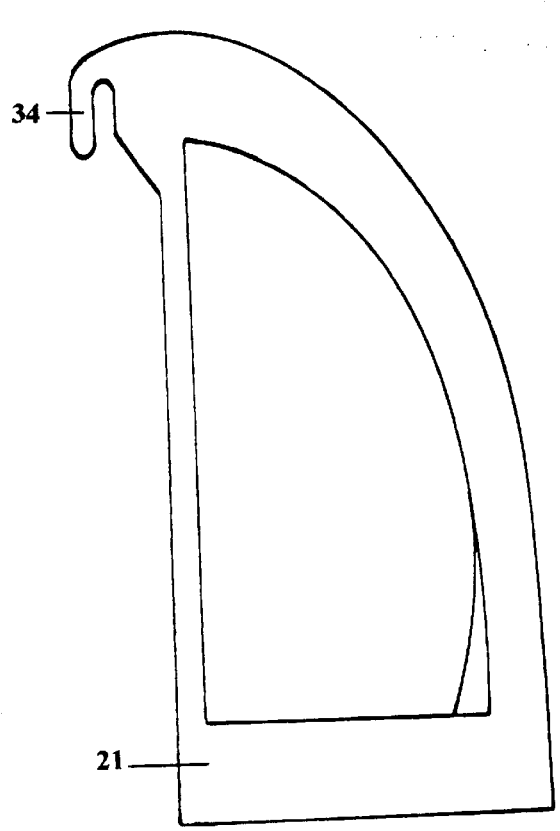
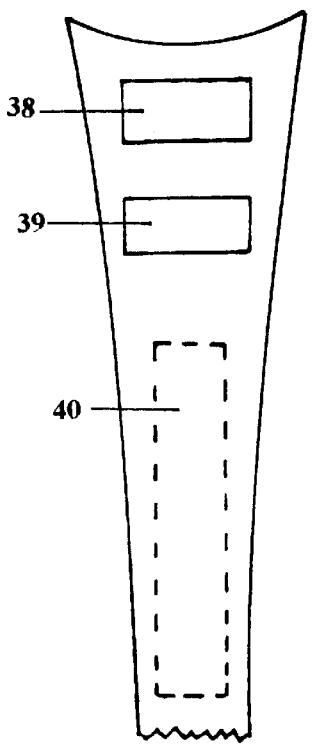

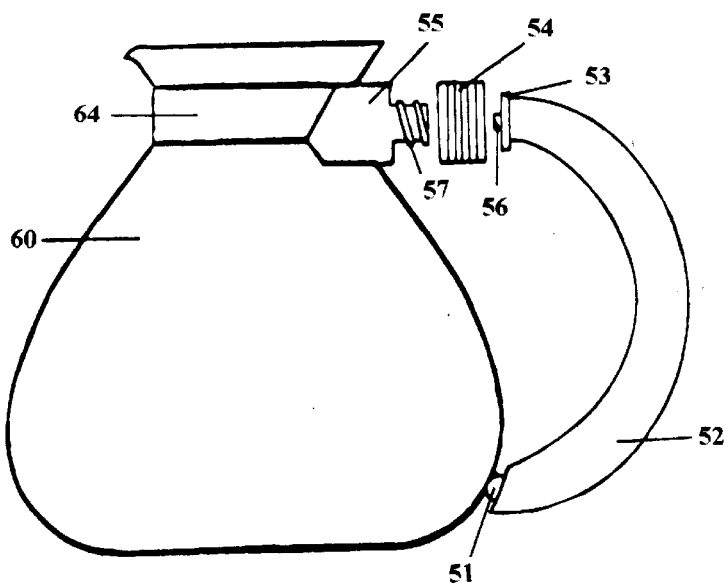
Fig. 8
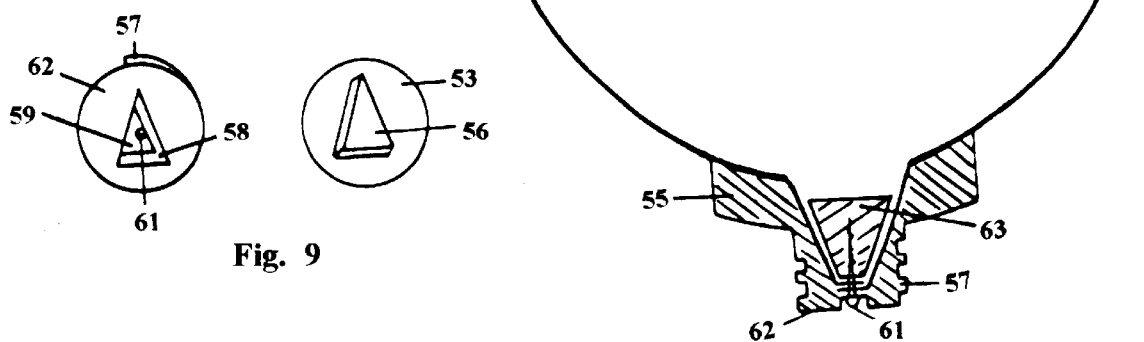
Fig. 9
Fig. 10

CARAFE WITH THERMAL SENSOR AND DIGITAL DISPLAY

BACKGROUND OF THE INVENTION

There are a great variety of coffee makers available. Some offer a programmable timer while others simply offer auto shut-off after two or four hours. Some even have a lighted on/off switch. None however have the ability of displaying the temperature of the coffee in its carafe.

This invention will be of particular help to those diners who ask the waitress for hot coffee and hope that they will get hot coffee. The waitress can glance at the temperature displayed on the handle of the carafe and know the temperature of the coffee within.

BRIEF SUMMARY OF THE INVENTION

Most coffee makers prepare ten or twelve cups of coffee at one time. Most handles are plastic and are designed such that the handle follows closely to the shape of the carafe and the handle generally has a plastic clip which makes good contact with the top of the carafe's glass bowl while the lower part of the handle is attached to a stainless steel band which supports the bottom of the carafe. The hand held portion of the handle generally protrudes out horizontally from near the top of the carafe and follows the shape of the carafe to the area that supports the stainless steel band.

This invention consists of a thermistor mounted on or in contact with one end of the stainless steel band and wired to a circuit board designed to properly interpret how the present temperature of the coffee is being reflected by the change in the characteristics of the thermistor and to send that interpretation to a digital display located at the upper portion of the handle.

BRIEF DESCRIPTION OF THE DRAWINGS

FIG. 2 is a side view drawing of the typical carafe handle.

FIG. 3 is the rear view of free-falling spacer 28, the one part that permits the complete removal of the glass carafe from its handle and electrical parts in two seconds time.

FIG. 4 is the same rear view of the free-falling spacer shown in FIG. 3 after the coffee has been poured out prior to placing the glass carafe in the dishwasher. In this figure, the complete carafe is in a "bottoms-up" position.

FIG. 5 is the top view of the free-falling spacer as envisioned with the carafe setting on a table.

FIG. 6 is an enlarged front view of the free-falling spacer with the carafe setting in its normal position. It is the same as rear view, FIG. 3 with the cylindrical collar not shown.

FIG. 7 displays the location of the digital display at the upper portion of the handle, the solar cell located just beneath it, and the circuit board located within the handle.

FIG. 8 displays the carafe of embodiment 2 with the method of its handle removal.

FIG. 9 displays the triangular protrusion and receptacle which prevents any movement of the handle with the collar tightened.

FIG. 10 is a cutaway view showing the assembly of the mounting bracket and neck band.

REFERENCE NUMERALS

| | | | |
|---|---|---|---|
| 20. | Brass screw | 41. | Center wall |
| 21. | Carafe handle | 42. | Rear wall |
| 22. | Stainless steel band | 43. | Battery |
| 23. | Thermistor | 51. | Spring loaded metal finger |
| 24. | Square stainless steel support washer | 52. | Carafe handle (embod 3) |
| 25. | Lock washer | 53. | Upper handle rim |
| 26. | Hex nut | 54. | Threaded collar |
| 27. | Forward wall | 55. | Mounting bracket |
| 28. | Free-falling spacer | 56. | Triangular protrusion |
| 29. | Side panels | 57. | Mounting bracket's thread |
| 30. | Housing | 58. | Triangular receptacle's sides |
| 31. | Power on/off switch | 59. | Triangular receptacle |
| 32. | Threaded battery cover | 60. | Glass bowl |
| 33. | Extremity of brass screw | 61. | Band screw |
| 34. | Glass bowl clip | 62. | Threaded end |
| 35. | Dotted line | 63. | Wedge |
| 36. | Threaded cylindrical collar | 64. | Neck band |
| 37. | Groove in free-fall spacer | 65. | Mounting bracket indicator |
| 38. | Digital display | 66. | Threaded collar indicator |
| 39. | Solar cell | 70. | Insulated carafe |
| 40. | Circuit board | 71. | Base |

DESCRIPTION OF THE PREFERRED EMBODIMENT

Figure 1:
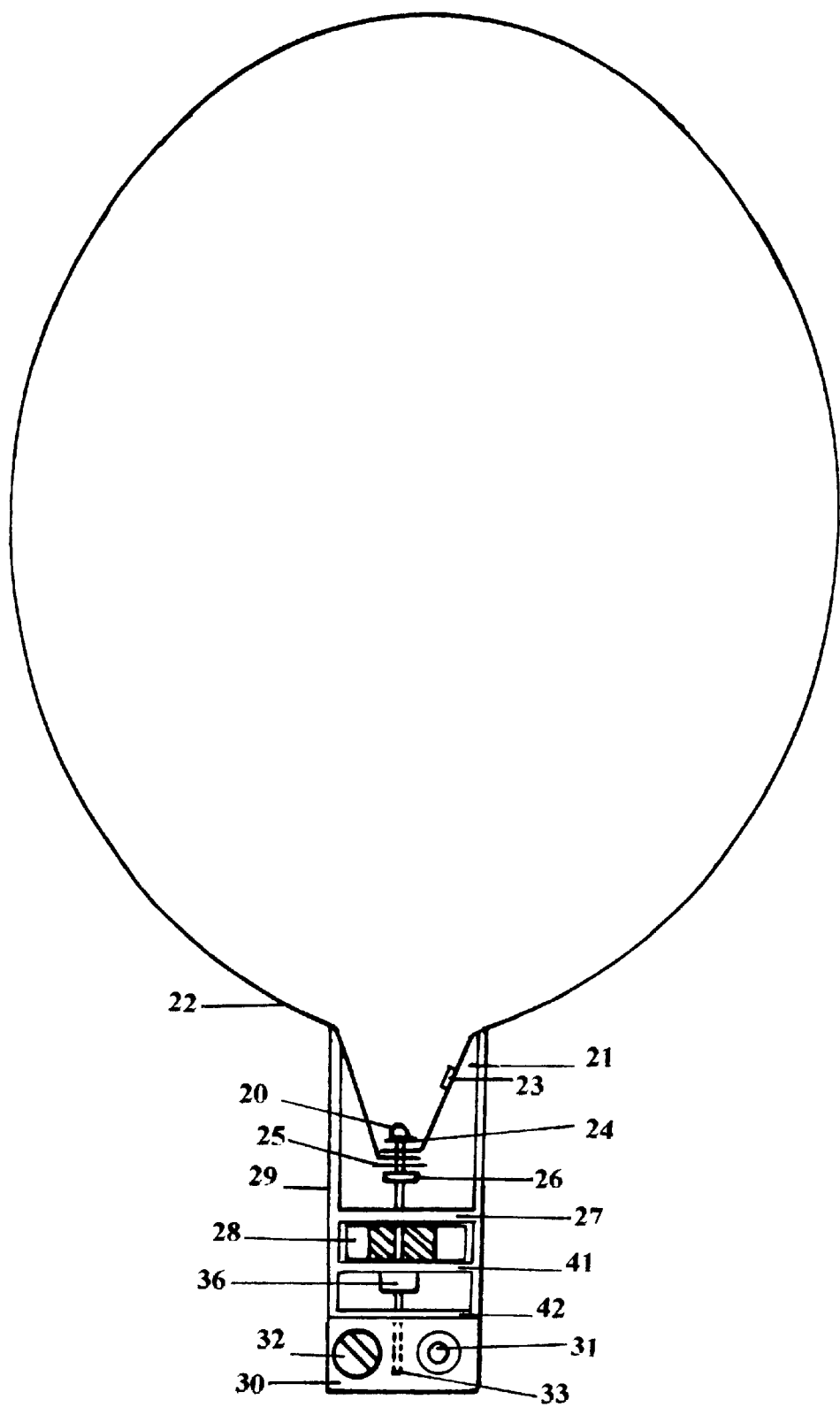
FIG. 1 is a drawing of the underside of the carafe's handle with the plastic covering of the bottom removed.

Unofficial drawings are being submitted. FIG. 1 is of the underside of the carafe handle 21 removed from the carafe. Stainless steel band 22 is identical to the three-fourths inch high band presently used by the vast majority of coffee makers to support their carafe's glass bowl. Thermistor 23 is located as shown with epoxy or other suitable adhesive. Two small holes centrally located horizontally in the band behind the thermistor aid in fastening it with epoxy or the like. Brass screw 20, an 8–32 machine thread screw extends to its extremity 33 located within housing 30. Square stainless steel support washer 24 is three-eighths inch per side and one-sixteenth inch thick. The two formed ends of band 22 with holes in proper position, are next placed on the screw followed by lock washer 25 and hex nut 26. All parts are now securely tightened with the hex nut.

All manufacturers of 10 and 12 cup coffee makers have designed the handles of their carafe to offer the proper support to its glass bowl. There is a large similarity in the method each company uses to support its glass bowl. The formation of the steel bands is almost identical to that shown in FIG. 1. The two ends of the band are normally joined together by a one inch long self-tapping screw which passes through the hole in the forward wall 27. This is the same hole through which our brass screw 20 passes in the opposite direction. However, the screw hole is first enlarged to accept the 8/32 brass screw.

Free-falling spacer 28, made of 5/16th inch steel and having rounded outer edges and corners, rides in the vertical channel formed by forward wall 27 and center wall 41 and the two side panels 29 of the lower portion of the carafe handle 21. The top of this channel is of such height to permit the threaded cylindrical collar 36 FIG. 4 to pass freely through the rectangular opening in the free-falling spacer when the carafe is held in a bottoms up position. The bottom of the channel is the area on which the two square feet of the free-falling spacer rest when the screw 20 passes through the top of groove 37 FIG. 3 and FIG. 6, when the carafe is setting on a table.

The free-falling spacer is placed in position as shown in FIG. 3 and the screw passes through the upper portion of groove 37 in FIG. 1, and FIG. 3 freely without binding at any point. The spacer must have freedom to fall vertically within the channel area indicated by dotted line 35 in FIG. 3 and FIG. 4. Please note that in each of these two figures, the numeral 35 is pointing to the bottom of the channel. FIG. 6 is an enlargement of the free-falling spacer providing a better view of groove 37. The groove is wide enough for easy passage of screw 20 but narrow enough to inhibit any penetration by cylindrical collar 36, shown in FIG. 1, 3, and 4. In FIG. 3 and 4, the dot shown in the center of cylindrical collar 36 represents the brass screw 20.

Center wall 41 and Rear wall 42 have a hole in direct alignment with the hole in the forward wall. The hole in the rear wall is of the proper size to pass the extremity of the brass screw freely. The hole in the center wall is one-half inch in diameter to allow for free passage of ⅜th inch diameter cylindrical threaded collar 36. Collar 36 is also ⅜th inch in length, and the edge of the collar facing the spacer is shaved slightly to prevent any interference with the spacer's fall. The collar is threaded onto the shaft of brass screw 20 to the point that it forces the free-falling spacer against the forward wall and is then backed off sufficiently to leave 50 thousandths of an inch between the free-falling spacer and forward wall 27. The collar is pinned to the shaft at this point to prevent any possibility of its movement in either direction. This free-falling spacer is taking up the space between the front wall and the cylindrical collar and is thereby holding proper tension on the steel band and supporting the glass bowl. The extremity 33 of the brass screw extends into the open space within housing 30. Its purpose is to keep the brass screw on a level plane after the carafe is turned upside down, for the removal of the handle.

To separate the glass bowl for placement in the dishwasher, pour the remaining coffee out and turn the carafe bottom side up. Push the band and the bottom of the handle toward each other. This releases all tension on the free-falling spacer and allows it to fall downward to the top of the channel, to the position shown in FIG. 4. Now the bottom of the handle can be pulled away from the glass bowl causing the cylindrical collar 36 to move through the longitudinal cutout in the free-falling spacer as shown in FIG. 4 thereby loosening band 22 so that it can be slid downward off the glass bowl.

This movement automatically frees the glass bowl clip and leaves the glass bowl ready for the dishwasher. This disassembly takes two seconds. Reassembly is almost as simple. We must now get the free-falling spacer to fall back into its original position between front wall 27 and cylindrical collar 36. With the glass bowl bottom-up and the handle's upper clip engaged with the bowl's opening, push the band onto the glass bowl and check that the pouring spout is in the correct position. While holding the band tightly into the handle and holding the handle tightly against the bowl, raise the lower part of the handle upward and backward in a 180 degree half circle until the carafe is in an upright position. Pushing the band back into the handle moved the cylindrical collar back in line with the center wall and the 180 degree backward rotation let the free-falling spacer slide back into its original position. The fact that the spacer is in its correct position can be checked by trying to pull the handle away from the bowl. The spacer is locked into its position between the forward wall and the cylindrical collar which is held under constant tension by the stainless steel band.

FIG. 2 displays a typical ten or twelve cup carafe handle without its supporting stainless steel band. Glass bowl upper support clip 34 is shown. Most of the support for the bowl is provided by the stainless steel band shown in FIG. 1.

FIG. 5 is a top view of free-falling spacer 28. The bottom view with the cut away rectangular area is shown in FIG. 1. The power on/off switch 31 FIG. 1 is located on the underside of housing 30. Likewise threaded battery cover 32 provides access to a single "AA" battery 43.

FIG. 7 offers a good view of the digital display 38, the solar cell 39 on the upper exterior of the handle Electrical means in the form of circuit board 40 and battery 43 are located within the handle and are not shown. The circuit board includes the ability to power-off the system if there has been no change in response from the thermistor in a two hour period. It should be noted that solar cells, digital displays, thermistors, and circuit boards containing commercially available, or custom chips, are readily available.

A second embodiment would be the same as this embodiment with the exception that it would use metric measurements and the temperature would be displayed in the Celsius Scale. Also this embodiment may use roller bearings in place of the free-falling spacer. Five-sixteenths inch (8 mm) or quarter inch (7 mm) roller bearings can be used in either the preferred embodiment or in this second embodiment in place of the free-falling spacer. These embodiments would also have the ability to vocally call for attention as needed, such as "Refill Needed" if the temperature as determined by the circuit board fell below 130 degrees Fahrenheit or 55 degrees on the Celsius scale.

A third embodiment provides the temperature of the coffee displayed in those carafes with a handle supported by a band around the neck of the carafe. FIGS. 8, 9, 10, and 11, demonstrate the embodiment for this type of carafe. In FIG. 8, the hollow, spring loaded metal finger 51 houses the thermistor, or other temperature sensing element. A slight spring tension (not shown) at the lower end of the carafe handle 52 ensures contact between the finger 51 and the lower portion of the glass bowl 60 holding the coffee. For simplicity in drawing, upper handle rim 53 is shown adjacent the handle's threaded collar 54 whereas the handle rim is actually enveloped by the side of the handle threaded collar closest to the handle rim. The threaded collar screws onto the threaded end of mounting bracket 55. Triangular protrusion 56 FIG. 8 and FIG. 9 has base angles of 70 degrees and a top angle of 40 degrees. FIG. 9 demonstrates the connection of the triangular protrusion 56 from upper handle rim 53 with its triangular receptacle 59 in the threaded end 62 of mounting bracket 55. Shown also are the triangle receptacle's sides 58 and the mounting bracket's thread 57 as well as band screw 61 which is also shown in a cutaway view in FIG. 10. This triangular connection between the carafe's mounting bracket and handle ensures that the carafe handle always maintains its vertical position with respect to the base of the carafe's glass bowl.

FIG. 10 displays the neck band 64 and how it is drawn snug as screw 61 is tightened to draw wedge 63 and the formed ends of the neck band deeper into the mounting bracket.

Figures 11, 12:
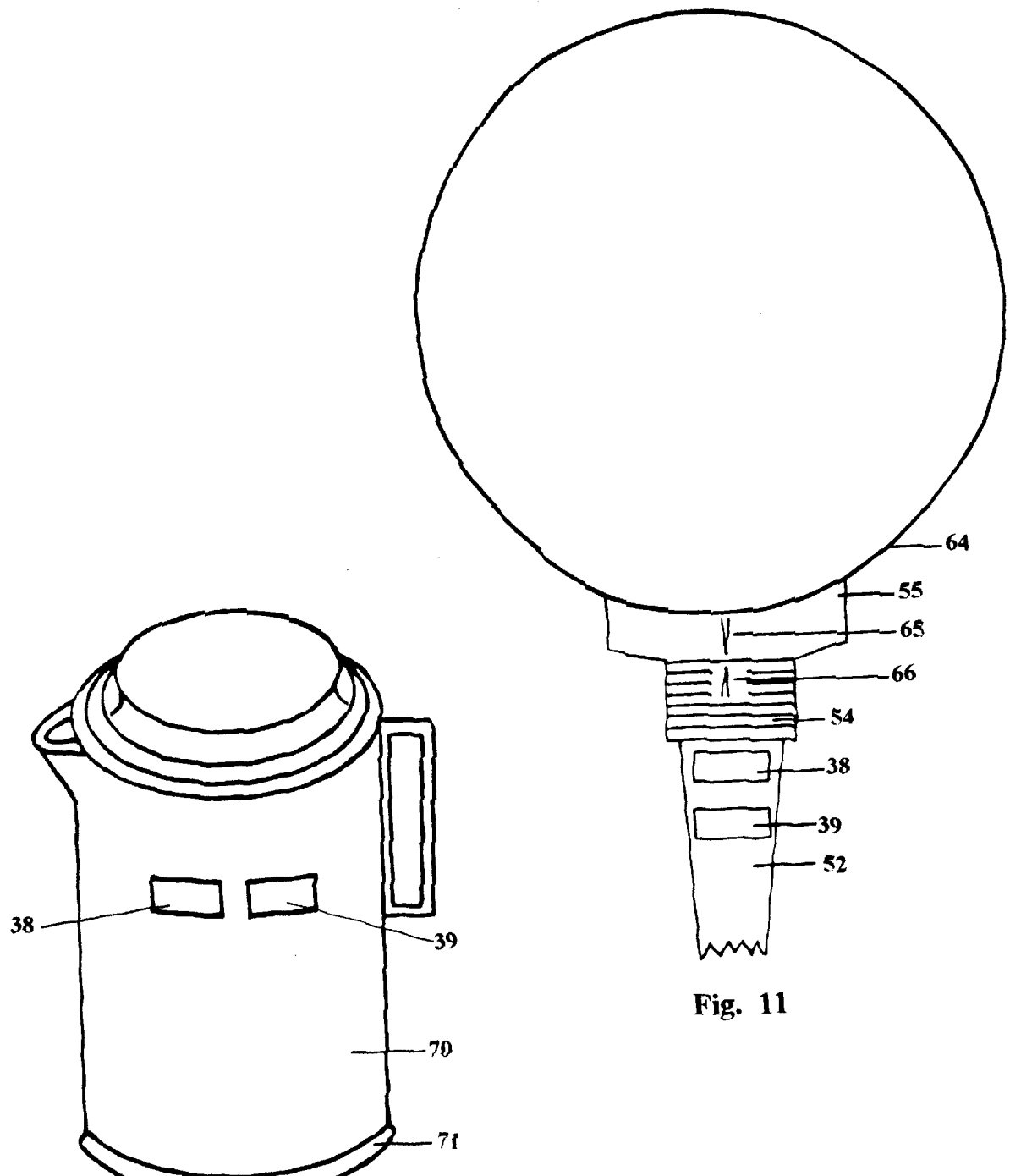
FIG. 11 is a plane view of the mounting bracket, threaded collar, and upper part of the handle assembly.
FIG. 12 is of an insulated carafe in its entirety.

FIG. 11 is a plane view demonstrating the handle's threaded collar fully tightened against the mounting bracket with the mounting bracket indicator 65 and the handle's threaded collar indicator 66 in perfect alignment. This is an indication that the collar is fully tightened and that a small plastic latch mechanism has snapped into a recess in the lower portion of the collar designed to prevent any unwanted loosening of the collar. This common latch mechanism is not shown. When it is desirable to place the carafe's glass bowl in the dishwasher, any coffee remaining is poured out, the carafe is turned upside down, and the plastic latch is depressed with one finger to enable the handle's threaded collar to be unscrewed from the mounting bracket. This removes all of the electronic components from the carafe's glass bowl and mounting bracket.

Reassembly is simply a matter of placing the triangular protrusion from the upper handle rim into its triangular receptacle in the threaded end of the mounting bracket and tightening the handle's threaded collar.

With the exception of the thermistor located in the spring-loaded metal finger, the digital display 38 FIG. 11, and the solar cell 39 FIG. 11, the circuit board and battery are located within the handle 52, and the location of a recessed power on/off switch, and battery access are left to the discretion of the manufacturer. The electronic operation of this embodiment is the same as that described in our preferred embodiment.

A fourth embodiment, FIG. 12, is of an insulated carafe 70. Visible are digital display 38 and solar cell 39. Thermistor 23 is located inside the insulated carafe in physical contact with the exterior of its glass container about two inches above its base 71. The location of the circuit board, vocal component, battery, battery cover, and power on/off switch, are left to the discretion of the insulated carafe manufacturer. The functioning of the electronic parts of this embodiment is the same as that described for the preferred embodiment.

What is claimed:

1. A carafe for coffee, or other liquids, having the ability of sensing and displaying the temperature of the coffee or other liquids within its enclosure comprising:

a carafe type bowl with quickly detachable handle attached to said bowl by a band held taut against the bowl's lower part and a clip fastening the bowl's upper lip, the quickly detachable handle being the repository of all the electronic and electric components used in measuring and displaying the temperature of the contents within the bowl, the handle being quickly detachable for cleaning of the glass bowl, the handle being quickly reattachable after cleaning the glass bowl.

2. The handle of claim 1 having a free-falling spacer which provides for quick detachment and quick reattachment of the glass bowl.

3. The handle of claim 1 having a number of ball bearings which provide for quick detachment and quick reattachment of the glass bowl.

4. The handle of claim 1 having a metal band attached to which is fastened a thermistor or other means of sensing change in temperature.

5. The handle of claim 1 housing a circuit board capable of evaluating the changes within the thermistor, or temperature sensor, and sending the proper temperature of the contents in the glass bowl in digital form to a digital display, and activating or deactivating other components which it controls.

6. The handle of claim 1 having a digital display in view of the person using the carafe with the temperature displayed followed in the display by the temperature degree indicator and by an upper-case F. indicating Fahrenheit, or an upper-case C. indicating Celsius temperature.

7. The handle of claim 1 containing a battery to provide power for the circuit board and its associated components and means provided for replacement of the battery.

8. The handle of claim 1 having an appropriate solar cell and circuitry for recharging the battery.

9. The handle of claim 1 having a power on/off switch for providing and removing power to the electronic circuitry.

10. A carafe for coffee having the ability of sensing and displaying the temperature of the liquid within its enclosure comprising:

a carafe type bowl with quickly detachable handle attached to a band held taut against the neck portion of the bowl, the quickly detachable handle being the repository of all the electronic and electric components used in measuring and displaying the temperature of the contents within the bowl, the handle being quickly detachable for cleaning of the glass bowl, the handle being quickly reattachable after cleaning the glass bowl.

11. The handle of claim 10 having a threaded collar which provides for quick detachment from and quick reattachment to the glass bowl.

12. The handle of claim 10 containing at its lower extremity a hollow metal tip housing a thermistor or other means of sensing change in temperature.

13. The handle of claim 10 housing a circuit board capable of evaluating the changes within the thermistor, or temperature sensor, and sending the proper temperature of the contents in the glass bowl in digital form to a digital display and activating or deactivating other components which it controls.

14. The handle of claim 10 having a liquid crystal, or equivalent, digital display in view of the person using the carafe with the temperature displayed followed in the display by the temperature degree indicator and by an upper-case F. indicating Fahrenheit, or by an upper-case C. indicating Celsius.

15. The handle of claim 10 having the vocal ability to call for attention when the need arises.

16. The handle of claim 10 containing a battery to provide power for the circuit board and its associated components and means provided for replacement of the battery.

17. The handle of claim 10 having an appropriate solar cell and circuitry for recharging the battery.

18. The handle of claim 10 having a power on/off switch for providing and removing power to the electronic circuitry.

* * * * *